United States Patent [19]
Wilkinson

[11] 3,720,460
[45] March 13, 1973

[54] PROJECTION LIGHT SOURCE AND OPTICAL SYSTEM
[75] Inventor: John N. Wilkinson, Durate, Calif.
[73] Assignee: Optical Radiation Corporation, Monrovia, Calif.
[22] Filed: April 19, 1971
[21] Appl. No.: 134,956

[52] U.S. Cl..................................352/198, 240/41.3
[51] Int. Cl...............................................G03b 21/00
[58] Field of Search.........352/198; 353/98; 240/41.3

[56] References Cited

UNITED STATES PATENTS

| | | | |
|---|---|---|---|
| 1,275,120 | 8/1918 | Ballman et al | 353/98 |
| 3,296,923 | 1/1967 | Miles | 352/198 X |
| 2,015,722 | 10/1935 | Moreno | 353/98 X |
| 2,682,195 | 6/1954 | Kauffman | 353/98 |

FOREIGN PATENTS OR APPLICATIONS 17,657   1915   Great Britain.........................353/98

Primary Examiner—Samuel S. Matthews
Assistant Examiner—Monroe H. Hayes
Attorney—John E. Wagner

[57] ABSTRACT

Disclosed is a lamp and reflector system designed to produce maximum energy through an aperture at a pre-determined intensity distribution across an aperture, particularly the film gate aperture of a movie projection system. The invention involves a gaseous discharge lamp having an arc or light source region of varying radiance with the radiance at one electrode substantially higher than the other and a modified eliptical reflector generally axially aligned with respect to the discharge lamp and with the primary focus of the reflector along the axis of the lamp but with the secondary focus at the plane of the aperture on a line forming an angle $\Delta$ with the axis of the lamp. Also disclosed is means for determining the optimum mirror or reflector length S in order to produce the maximum energy at a given intensity distribution across the film gate aperture of a projector system. The arc length, radiance distribution, the angle $\Delta$, the mirror or reflector length S and the aperture dimensions are correlated for a reasonable projection $f$/number in a manner that the image of the brightest portion of the arc is superimposed upon the extremities of the aperture from all points on segment S and the images of the arc at the aperture from various points on the ellipse segment form a family of images with the average size equal to approximately ¾ of the diagonal dimension. In achieving this type of image, the highest radiance portion of the arc is placed at the first focus of the mirror.

13 Claims, 12 Drawing Figures

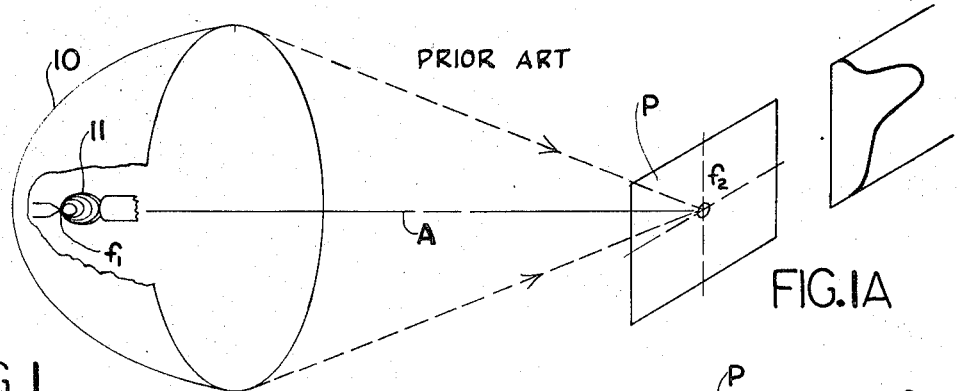
FIG. 1 / FIG. 1A (PRIOR ART)
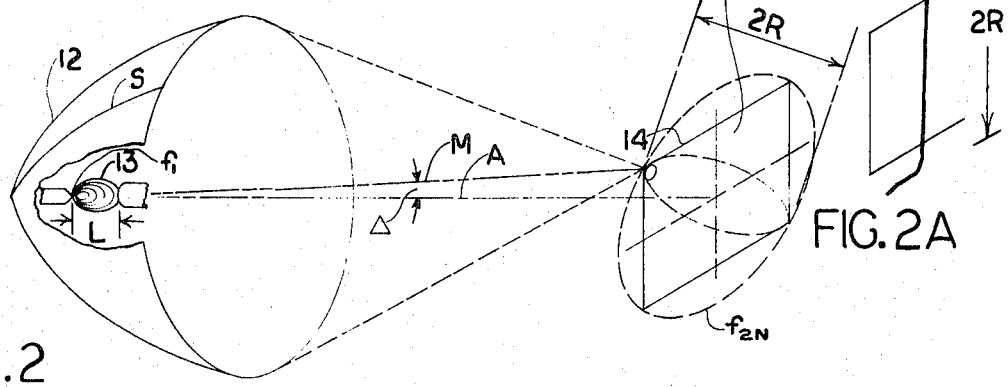
FIG. 2 / FIG. 2A
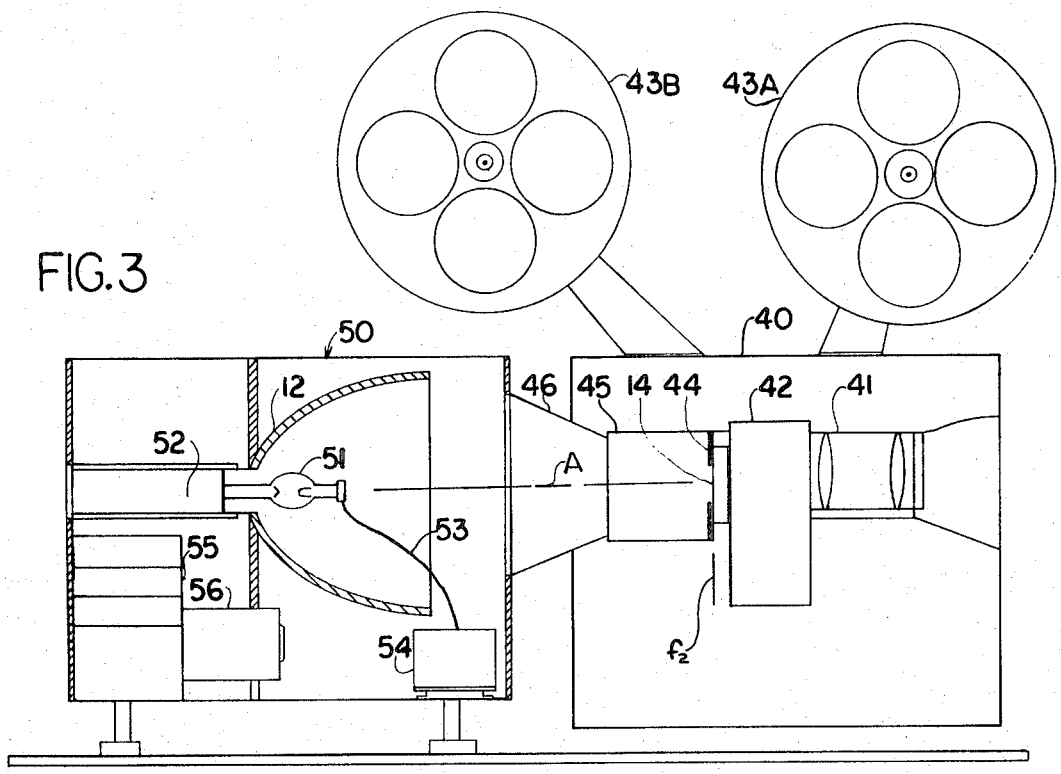
FIG. 3

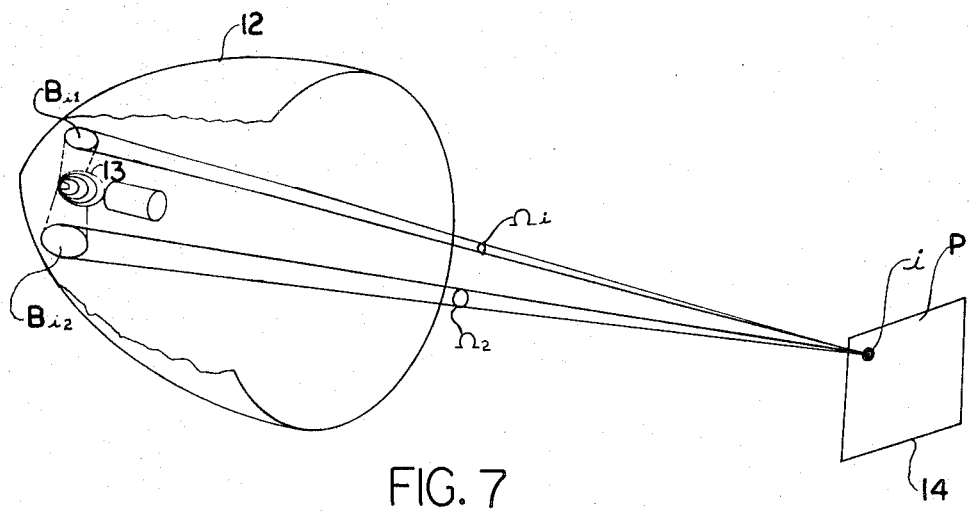
FIG. 7
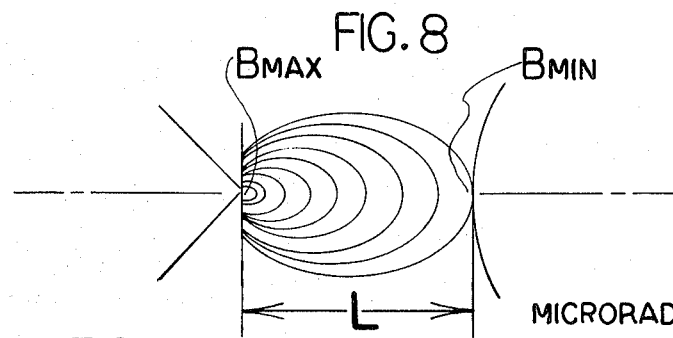
FIG. 8 MICRORADIANCE PLOT
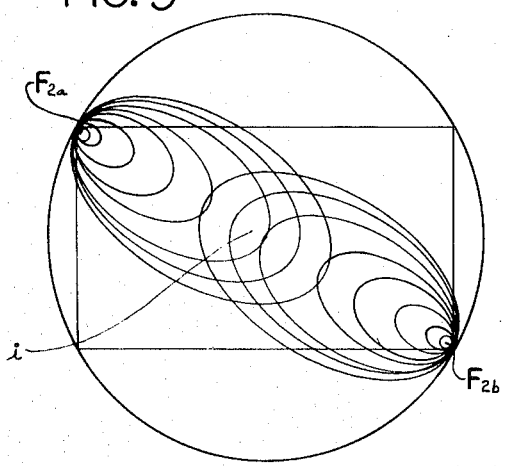
FIG. 9
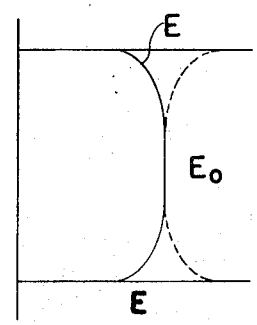
FIG. 10
$E/E_0 = 0.6$ to $1.4$ 3,720,460

PROJECTION LIGHT SOURCE AND OPTICAL SYSTEM

BACKGROUND OF THE INVENTION

Heretofore, the use of parabolic and eliptical reflectors in cooperation with Xenon and arc lamps has been well known. Particularly in the case of solar simulators where a high intensity beam of uniform or pre-determined intensity is desired. Typically, the reflectors are designed to employ multiple elliptical sections, each of which serve to contribute to a reasonably uniform intensity image. This has been accomplished by making the reflector in sections with the axis of respective sections displaced from the axis of the lamp. Typical of such a system is that disclosed by the U.S. Pat. No. 3,449,561 to R.W. Basil, et al.

The use of such composite reflectors is reasonably effective in seeking the objective, but the reflector surface itself must be precisely machined and, since it is a composite shape, involves either discontinuities or ineffective portions of the reflector.

One other approach to the problem of uniform illumination of an image plane is illustrated in the U.S. Pat. No. 1,275,120 to Ballman employing a surface of revolution produced from an ellipse section with its major axis displaced to produce a ring of second foci. In order to achieve reasonable uniformity of intensity across the film or aperture, it was necessary to effectively defocus by placing the film or aperture a distance from the second focus of the optical system.

BRIEF STATEMENT OF THE INVENTION

I have found that it is possible to use a surface of revolution constituting single elliptical segment reflector with its axis displaced to a pre-determined angle $\Delta$ related to (1) the interfocal distance of the reflector, and (2) the aperture size to produce pre-determined intensity across the illuminated aperture. Selectively, uniform, dark edge or bright edge intensity may be obtained.

In accordance with this invention, I additionally obtained maximum energy through the aperture at this pre-determined distribution. These two objectives are achieved basically by the rotation of the segment of an ellipse constituting a reflector surface about the generating axis of the ellipse passing through the first focus and at such an angle that a ring of foci circumscribes the aperture illuminated by the light source and reflector. In the case where the aperture is rectangular, the diameter of the ring of foci is equal to the diagonal length of the rectangular aperture. Where the light source is non-uniform in radiance along its length as is typical of arc discharge lamps (e.g., Xenon d.c. arc lamps) where the intensity of the arc is greater at one of the electrodes, the arc immediately adjacent to that electrode is imaged at the aperture extremity. In general, the ellipse, angle of rotation $\Delta$ and arc length are chosen for a given projection f/number so that the average size of the image of the arc produced by the ellipse at the aperture approximates ¾ of the largest transverse dimension of the aperture. The length of the mirror segment is determined to encompass the maximum energy radiated within the polar limits of the lamp, the exact length being determined from the arc length radiance gradient within the lamp and the required intensity distribution at the aperture. In accordance with this invention, the film gate aperture is located at the second focus of the rotated ellipse.

BRIEF DESCRIPTION OF THE DRAWINGS

This invention is described briefly above and may be more clearly understood from the following detailed description and by reference to the drawings in which:

FIG. 1 is a perspective view of an eliptical reflector in accordance with the prior art with portions broken away for clarity;

FIG. 1A is a graphical representation of the intensity of the lighting system of FIG. 1;

FIG. 2 is a perspective view of a modified ellipse reflector assembly in accordance with this invention with portions broken away for clarity;

FIG. 2A is a graphical representation of the intensity characteristic through an aperture of the assembly of FIG. 2;

FIG. 3 is a side elevational view partly in section of a lamp housing in accordance with this invention shown in operative relationship with a movie projector;

FIG. 7 is a simplified perspective view with portions broken away for clarity of a lighting system in accordance with this invention showing the effect of arc radiance and solid angle;

FIG. 8 is an enlarged simplified view of an arc source showing the radiance distribution of the arcs used in accordance with this invention;

FIG. 9 is a simplified arc image at the aperture for this invention in operation; and, FIG. 10 is a graphical representation of the light intensity across the aperture of FIG. 9.

DETAILED DESCRIPTION OF THE INVENTION

Figure 5:
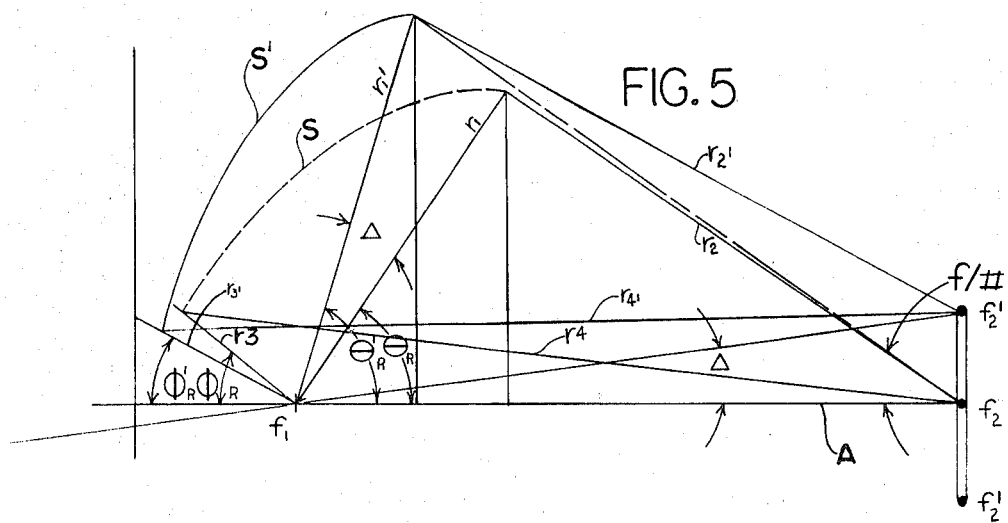
FIG. 5 is a graphical representation of the effect of ellipse rotation in accordance with this invention.

Now referring to FIG. 1, a simple elliptical reflector 10 with light source 11 located at the first focus $f_1$ of the reflector 10 is shown. Light energy from the source 11 is radiated in the direction of the arrows and focused on plane P which is normal to the longitudinal axis A. The point of intersection of the axis A and plane P is the second focus $f_2$ of the ellipse. In this case, the maximum local intensity is at the center of plane P and the intensity variation between the axis and off-axis areas makes such a system of limited value. The relative intensities across the aperture of plane P is illustrated in FIG. 1A. More uniform distribution of light intensity in the case of FIG. 1 may be obtained but with loss of energy from defocussing either the light source 11 or plane P by translating them along axis A from their illustrated positions at the first and second foci of the ellipse. In this embodiment, uniformity of distribution and maximum energy transfer may not be achieved simultaneously.

FIG. 2, by way of contrast from FIG. 1, illustrates the basic parameters of this invention. In this case, reflector 12 is nearly ellipsoidal in shape. The reflector 12 actually is a surface of revolution of the line S around the axis of the reflector A. The line S is a segment of an ellipse with its major axis M passing through the first focus $f_1$ and intersecting the axis A at a deviation angle $\Delta$. The net result is that the second focus $f_2$ of the ellipsoidal shape 12 is not a single point but a ring of foci $f_{2N}$ lying in the plane P. The angle $\Delta$ is equal to the angle whose tangent substantially equals one-half the maximum transverse dimension of the associated aperture over the interfocal distance of the ellipse. Normally, $\Delta$ ranges from ½° to 3°.

The light source in this system located at the first focus $f_1$ of the reflector 12 is an arc 13 having a significant length L. In gaseous discharge lamps, particularly Xenon lamps, there is a radiance gradient ratio between the two electrodes in the order of 10 to 1. In any such case, the lamp is oriented with the highest radiance portion of the arc located at the first focus $f_1$. Given the parameters, light source radiance gradient, arc length and rotation angle $\Delta$, the system is designed to cooperate with an aperture 14 and pass maximum light energy through the aperture and at substantially uniform intensity (see FIG. 2A). This is accomplished in the ideal case when these parameters are correlated to image the entire arc length L within the largest transverse dimension of the aperture from all points on the rotated elliptical segment. In this case, the image of arc 13 is illustrated as having an overall length at plane P of 2R where R is the radius of the ring of the second foci $f_2$ and one-half the largest transverse dimension of the aperture 14. Where the aperture 14 is rectangular as shown in FIG. 2, 2R is equal to the diagonal length.

The adaptation of this invention to a truly significant application is illustrated in FIG. 3. There the invention is employed as a high intensity light source for use with a motion picture projector 40. The optics of the projector 40, including the normal lens 41, film drive mechanism 42, and reels 43A and 43B are unaffected by the use of this invention. The film gate 44 of the projector 40 defines the aperture 14 of FIG. 2. The lamp housing 45 of projector 40 is open at the rear (or side in certain application) to mate with a shroud 46 of the projector lamp house assembly 50 of this invention. This assembly 50 includes as the basic elements a Xenon lamp 51 axially aligned within reflector 12. The assembly 50 includes a base connector 52 and flexible power connector 53 for the Xenon lamp 51 as well as an igniter circuit assembly 54 and suitable blower 55 and motor 56 for cooling the lamp 51 and entire assembly. The most significant structural relationships of the assembly 50 of FIG. 3 are the following:

1. the lamp 51 is aligned with the arc on the optical axis of the reflector 12, aperture 14 and projection lens 41;
2. the cathode electrode of the lamp 51 is positioned at the first focus $f_1$ of the reflector 12; and,
3. the film plane of the projector 40 behind the film gate 44 is normal to the axis A and located at the plane of the second foci $f_2$ of the system.

Figure 4:
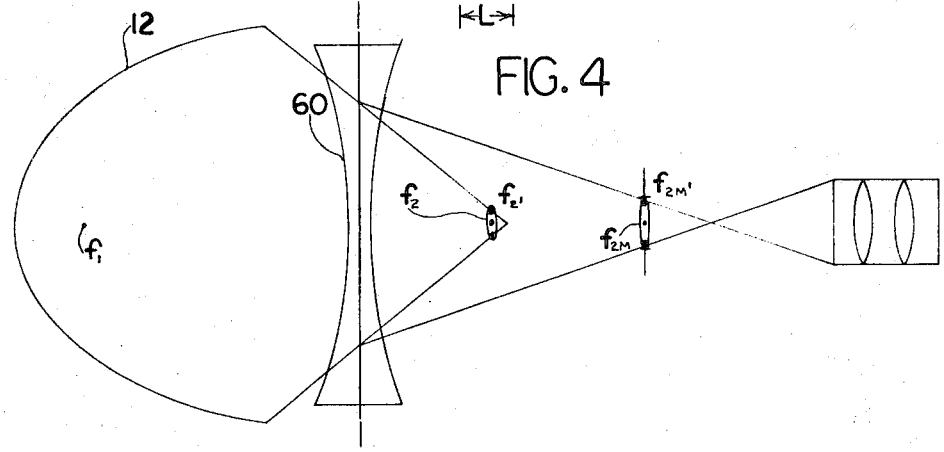
FIG. 4 is a simplified ray diagram of an optical system in accordance with this invention including a negative lens.

In certain cases, it is desirable for the same mirror or reflector to be used for different size apertures, for example, 16mm and 35mm. Where the system is designed in accordance with this teaching for a 16mm aperture, 0.27 × 0.37 in., the same reflector and lamp assembly may be used for larger systems, e.g., 35mm, by the addition of a negative lens to enlarge or magnify the image and circumscribe the 35mm aperture. This is illustrated in FIG. 4 in which the reflector 12 has its foci $f_1$ and $f_2$ and a negative lens 60 is positioned to magnify the image and produce an image at a modified second focus $f_{2M}$ at the required aperture plane P. This use of negative lens allows the adaptation of this invention to different aperture sizes without modification of the lamp-reflector combination. Where the reflector is made up of a rotated elliptical section as has been described above, the second focus is actually the ring of foci $f_2'$. The negative lens 60 moves the second focus to form the modified ring of foci $f_{2M}'$. In addition to the movement of the second focus $f_2$, it also changes the cone angle as is clearly apparent in FIG. 4. This allows the same light source to be received by a projection lens assembly of a different $f$/number. For example, a 16mm projection system has nominally an $f/1.6$ projection lens as compared with a 35mm having $f/1.9$ projection lenses.

FIG. 5 illustrates the effects of ellipse rotation in accordance with this invention. The original elliptical segment S is shown as a dashed line extending between selected polar angles $\phi_L$ and $\theta_L$ of the arc source at $f_1$. The angles $\phi_R$ and $\theta_R$ normally encompass approximately 70–90 percent of the energy emitted from the light source. The extreme ray patterns of the light from the source at $f_1$ are identified as $r_1r_2$ and $r_3r_4$ which converge at the second focus $f_2$.

When the segment S is rotated about $f_1$ in a positive direction by angle $\Delta$, the segment becomes S'. The extreme ray paths now become $r_1'r_2'$ and $r_3'r_4'$ converging on focus $f_2'$ (the aperture extreme point). When the line S' is rotated about axis A, it generates the desired reflector contour and $f_2$ becomes a ring of foci of the radiance portion of the arc. The $f$/number of the system is illustrated in FIG. 5 and is defined as the angle between the longitudinal axis and a line connecting the center of the aperture at the second focal plane and the outer edge of S'. The $f$/number is a constraint in the design of a system and is usually limited by the projection lenses available for projection. For 16mm projectors, the normal $f$/number is 1.6 and ranges from 1.0 to 2.4 and for 35mm is normally 1.9 and ranges from $f/1.5$ to $f/2.7$.

The same effect can be achieved by ellipse rotation in a negative direction $-\Delta$ where surface S' falls inside S. In the case of positive rotation, the arc length extends from the first focus $f_1$ toward the second focus $f_2$ with the highest radiance electrodes at the first focus $f_1$. With negative rotation $-\Delta$, the highest radiance electrode is again placed at the first focus $f_1$ but the length of arc L now extends away from the second focus $f_2$. This allows for a degree of flexibility in lamp mount design. The length of the segment S' is determined in conjunction with the length of the light source, its polar emitting characteristics and the relative magnification of the arc at various points along the surface S' at the aperture plane.

Figure 6:
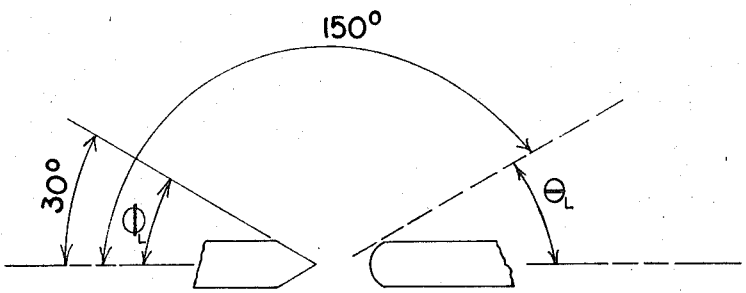
FIG. 6 is an enlarged fragmentary view and polar radiation diagram of a typical light source used in accordance with this invention.

As a first order, the length of segment S and S' is equal to the distance on curve S between the projected polar coordinates of radiation of the light source. This is illustrated in FIG. 6 showing the practical limitations of polar distribution of typical Xenon lamp. The light emitted falls in an annulus as seen in FIG. 6, with the angles $\phi_L$ and $\theta_L$ equal to approximately 30°. The angles $\phi_L$ and $\theta_L$ are used above in determining the length of segment S of the ellipse of FIG. 5.

The effect of radiance, or more correctly variable radiance, of the arc must be considered in carrying out this invention. FIG. 7 illustrates the effect. Given the reflector or mirror 12 and arc 13 and plane P, the irradiance at a point i on the plane should be approximately equal to the irradiance, $E_i$, at each other point on the plane P in the aperture 14. The irradiance at the point i is in actuality the summation of brightness from all portions of the arc 13 times the solid angle $\Omega$ from the mirror. This may be expressed as $$E_i = B_i \Omega = \sum_{j=1}^{m} B_{ij} \Omega_{ij}$$

where $m =$ the number of discrete brightness zones on the mirror as seen from point $i$.

$B_{ij} =$ brightness of a zone at the arc as seen at point $i$.

$\Omega_{ij} =$ solid angle subtended by the brightness zone $B_{ij}$ from point $i$.

The optimum mirror design for intensity uniformity at the aperture is obtained when the following criteria is met:

$$B_i \Omega_i \cong K$$

Achieving this objective is accomplished by increasing $\phi_M$ and $\theta_M$ of the mirror so that all of the light energy is not collected. Normally, $\phi_M$ of the mirror will be increased in the order of 10°–20° from the nominal 30° limit of lamp output and $\theta_M$ of the mirror will be increased 15° to 30° resulting in the capture of at least 70 percent of the light energy of the light source and the irradiance at the aperture varying by no more than 75 percent over the aperture. If one will accept lesser uniformity, the angles $\phi_M$ and $\theta_M$ of the mirror may be increased by smaller amounts.

These criteria are most significant where the light source such as a Xenon arc lamp has a high brightness ratio, e.g., 6-1 to 10-1, between the two electrodes. Thus, by placing the brighter electrode at the focus $f_1$ and rotating the elliptical section, the mirror then images the high brightness area at the extremities of the aperture. When doing this, the following occur: the high brightness areas are seen at the extremities of the aperture with corresponding small solid angles while the lower brightness areas are imaged in the aperture with a larger solid angle. The resulting product of radiance times the solid angle at each position of the aperture becomes nearly a constant at the proper value of $\phi_M$ and $\theta_M$.

This is illustrated in FIG. 9 showing a typical rectangular aperture of a movie projection system. Two distinct foci $f_{2a}$ and $f_{2b}$ of the cathode appear in the drawing, coinciding with opposite corners. The various levels of brightness are shown as overlapping and the average image size of the light source produced by the reflector fills approximately ¾ of the diagonal length of the aperture. The intensity of illumination throughout the aperture is the summation of all of the images and as indicated above. The irradiance at any point $i$ in the aperture is equal to the summation of all of the brightness $B_{ij}$ times the solid angle $\Omega_{ij}$ subtended at point $i$. By adjusting the length of these surfaces described above in connection with FIGS. 5 and 6, a pre-determined ratio of intensity across the aperture may be achieved.

A typical intensity variation curve is shown in FIG. 10 as the plot E. In this case, the ratio of minimum to maximum intensity of $E/E_o$ can be controlled between 0.6 and 1.4. The optimum for many applications is $E/E_o = 1$ and this may be substantially accomplished by employing this invention. In certain cases where a bright edge image is desired as illustrated by the dashed curve in FIG. 10. This effect may be achieved by varying one additional parameter of the optic system. The arc length L is reduced. A shorter arc length is imaged in the same manner as shown in FIG. 9 but with less overlap producing a bright edge aperture. Therefore, it may be seen that by employing the teaching of this invention an optimum aperture controlled relative intensity light source may be achieved.

The above described embodiments of this invention are merely descriptive of its principles and are not to be considered limiting. The scope of this invention instead shall be determined from the scope of the following claims, including their equivalents.

I claim:

1. A lighting system for producing uniform light distribution across an aperture comprising:

a light source including a pair of spaced electrodes producing a region of light of length L therebetween having a polar radiation characteristic between a pair of angles $\phi_L$ and $\theta_L$;

a reflector constituting a surface of revolution about a longitudinal axis coinciding with a line between said electrodes through said region of light;

the axis of said reflector rotated by an angle $\Delta$ to define a ring of foci;

means defining an aperture coinciding with said ring of foci;

said surface of revolution comprising a segment of an ellipse having a length between intercept angles $\phi_M'$ and $\theta_M'$ wherein said angles $\phi_M'$ and $\theta_M'$ constitute polar angles of at least 10° greater than the polar angles of the light source $\phi_L$ and $\theta_L$;

said reflector having an average magnification such that it produces an average image size of said light source substantially equal to ¾ of the maximum transverse dimension of said aperture.

2. The combination in accordance with claim 1 wherein the angles $\phi_L$ and $\theta_L$ are each in the order of 30° respectively.

3. The combination in accordance with claim 1 wherein said reflector length S' is in the order of the distance between the projected angles 40°–50° and 120°–135° measured from the first focus and the longitudinal axis.

4. The combination in accordance with claim 1 including lens means positioned between said reflector and said aperture normal to the axis of the system to adjust the size of the image of said light region whereby the ring of foci coincide with the corners of different size apertures.

5. The combination in accordance with claim 1 wherein the axis of said reflector is rotated outward and said light source is positioned with a first electrode at the first focus of the ellipse segment of said reflector and the second of said pair of spaced electrodes of said light source spaced from said first electrode in a direction toward said ring of foci.

6. The combination in accordance with claim 1 wherein the axis of said reflector is rotated inward and said light source is positioned with a first electrode at the first focus of the ellipse segment of said reflector and the second of said pair of spaced electrodes of said light source spaced from said first electrode in a direction away from said ring of foci.

7. A light system comprising:
a light source constituting a lamp having a pair of aligned spaced electrodes producing a region of light therebetween having a brightness gradient ranging from a maximum brightness adjacent to one electrode and a lesser brightness adjacent to the second of said pair of electrodes;
said spaced electrodes and the region of light therebetween generally falling on a line defining the axis of said lighting system;
a reflector constituting an eliptical surface of revolution with its axis rotated from the axis of said lighting system about the first focus of said elliptical surface by an angle delta to define a ring of foci encircling the axis of said lighting system;
means positioning said reflector with its first focus coincident with the region of highest brightness of said region of light; and
means defining a light barrier plane normal to said axis coincident with said ring of foci;
said last means including an aperture at said ring of foci and having a major transverse dimension equal to twice the tangent of angle delta times the interfocal distance of the unrotated ellipse defined by said reflector;
the distance L between said spaced electrodes and the effective length of said reflector S' as determined by its intercept of angles $\phi_M'$ and $\theta_M'$ producing magnified images of the region of light at the plane of the second focus with the average length of images falling within the maximum transverse dimension of said aperture with the images of the maximum brightness region of light source coinciding with the extremities of said aperture;
the angles $\phi_M'$ and $\theta_M'$ being both greater than the corresponding polar angles $\phi_L$ and $\theta_L$ of the light source.

8. The combination in accordance with claim 7 wherein said light source is a gas discharge lamp having a brightness ratio of at least 6 to 1 between the electrodes.

9. The combination in accordance with claim 7 wherein said light source has a brightness ratio of at least 6 to 1 between the electrodes.

10. The combination in accordance with claim 7 wherein the length L of the region of light and the average magnification of said reflector are selected to produce an average image length at said aperture equal to substantially ¾ of the maximum transverse dimension of said aperture.

11. The combination in accordance with claim 7 wherein said reflector constitutes an eliptical surface of revolution with its axis rotated outward from said axis and said one electrode of said pair of aligned spaced electrodes of said light source is positioned at said first focus and the second of said electrodes is positioned between said first focus and said ring of foci.

12. The combination in accordance with claim 7 wherein said reflector constitutes an elliptical surface of revolution with its axis rotated inward from said axis and said one electrode of said pair of aligned spaced electrodes of said light source is positioned at said first focus and the second of said electrodes is positioned away from said ring of foci.

13. The combination in accordance with claim 7 wherein said aperture is the rectangular film gate of a projector system and the greatest intensity region is imaged at the corners of said rectangular aperture.

* * * * *